United States Patent [19]

Levy

[11] Patent Number: 4,798,690

[45] Date of Patent: Jan. 17, 1989

[54] MOLDING A GLASS-PLASTIC COMPOSITE LENS

[75] Inventor: Sheldon L. Levy, Prairie Village, Kans.

[73] Assignee: Electric Power Research Institute, Inc., Palo Alto, Calif.

[21] Appl. No.: 926,617

[22] Filed: Nov. 3, 1986

[51] Int. Cl.$^4$ .............................................. B29D 11/00
[52] U.S. Cl. .................................... 264/1.7; 156/102; 156/106; 264/322
[58] Field of Search ................ 264/1.7, 322; 156/102, 156/106, 99

[56] References Cited

U.S. PATENT DOCUMENTS

| | | | |
|---|---|---|---|
| 2,361,589 | 10/1944 | Bennett et al. | 264/1.7 |
| 2,635,289 | 4/1953 | Owens | 264/1.7 |
| 3,982,822 | 9/1976 | Conder et al. | 156/106 |
| 4,227,950 | 10/1980 | Spycher | 264/1.7 |
| 4,304,751 | 12/1981 | Li et al. | 264/322 |
| 4,319,945 | 3/1982 | Howden | 264/1.7 |
| 4,332,767 | 6/1982 | Kitanaka et al. | 264/322 |
| 4,390,489 | 6/1983 | Segal | 264/322 |
| 4,495,015 | 1/1985 | Petcen | 264/1.7 |
| 4,543,146 | 9/1985 | Petcen | 264/1.7 |
| 4,595,551 | 6/1986 | Maurer | 264/322 |

FOREIGN PATENT DOCUMENTS

| | | | |
|---|---|---|---|
| 3032233 | 3/1981 | Fed. Rep. of Germany . | |
| 1147700 | 3/1985 | U.S.S.R. | 156/102 |

*Primary Examiner*—James Lowe
*Attorney, Agent, or Firm*—Flehr, Hohbach, Test, Albritton & Herbert

[57] ABSTRACT

A method is provided for producing a molded composite form comprising a substrate bonded to a thermoplastic element whereby the thermoplastic element, either separate from or together with the substrate, is heated to a first temperature sufficient to soften prior to placement in a mold with the substrate. The thermoplastic element and substrate are then comolded in a cool mold whereby the composite is cooled and shaped into a predetermined configuration in one operation.

4 Claims, No Drawings

MOLDING A GLASS-PLASTIC COMPOSITE LENS

The present invention is directed to a method for producing composite materials formed by comolding of a polymer layer onto a substrate. In particular, the present invention is directed to a process for the manufacture of composite glass-plastic articles.

Composite materials wherein one of the materials is a plastic and the other material is a hard substrate are important for many applications. Such composites take advantage, for example, of the properties of the plastic material which is light, thermally formable at relatively low temperatures and which may have desirable optical properties. The properties of the substrate, which in many instances is glass, are also useful in that it can be durable, scratch-resistant and chemically relatively inert. For example, the advantages of combining the light weight of clear plastics with the scratch-resistance and chemical durability of glass in a composite material usable as a lens is disclosed in U.S. Pat. No. 2,361,589. Heretofore, approaches to forming lenses, either by molding or casting, have been to contact the plastic (polymer) material with the substrate (usually glass) sometimes with an interstitial bonding adhesive, and to place the composite into a cold mold, and then to heat the entire assembly, including the mold, to a temperature at which the plastic, which may be thermosetting, and/or the adhesive, which may be thermoplastic, is molded and bonded to the substrate. Depending on the plastic and the adhesive, if used, a subsequent heat curing is sometimes utilized. Examples of such processes are disclosed in U.S. Pat. Nos. 4,227,950 and 3,982,822.

Disadvantages of these methods, however, are that the processes are inefficient because the time and heat energy required to thermally cycle the mold is wasteful, i.e., the mold must be cooled before it can be reused. Furthermore, by heating the mold while it is in contact with the surfaces to be molded, the likelihood of adhesion of the polymer surface to the surface of the mold increases, sometimes requiring an additional step to release the molded article from the mold.

Injection molding is used, but sometimes this method cannot be utilized if extremely thin polymer layers are required.

It is, therefore, an object of the present invention to provide an improved method for producing composite materials by comolding of a polymer layer onto a substrate, which is efficient both in the time required to form the molded product and in the energy required to recycle the mold.

It is a further object of the present invention to provide an improved method for manufacturing lenses comprising a polymer and a glass substrate.

These and other objects will be apparent to those skilled in the art from the following description of the preferred embodiment and appended claims.

The present invention provides a method for producing a composite form comprising a substrate comolded onto a thermoplastic element, comprising the steps of providing a heated composite of a substrate in contact with a thermoplastic element at a first temperature sufficient to soften the thermoplastic element for a molding operation; juxtaposing the heated composite in a mold cavity characterized by a predetermined surface configuration, the cavity being at a second temperature less than the first temperature whereby the composite is shaped into the desired configuration; and removing the molded composite from the cavity. The initial heated composites may be provided by either first contacting the substrate with the thermoplastic element and heating both together external to the mold, or by separately heating the substrate and then contacting it with a thermoplastic element.

In accordance with the invention, a comolded composite article is produced comprising a substrate bonded to a thermoplastic element, which is produced by a method which includes the step of heating the unmolded composite prior to placement into a cold mold cavity. A surface-active agent may also be used to prime the surface of the thermoplastic or substrate surface. Suitable primers include silanating agents.

The method of the invention comprises the initial step of providing a heated composite of the substrate in contact with the thermoplastic element at a first temperature sufficient to soften the thermoplastic element to a formable state for a molding operation. Many thermoplastics are known in the art and the range permissible for the first temperature will depend upon the particular thermoplastic which is utilized. Commonly used thermoplastic elements for making lenses includes such polymers as methyl methacrylate polymers, cellulose acetate butyrate polymers, carbonates, such as epoxy and allyl carbonates. Preferably the thermoplastic will be cross-linked so that the temperature at which it is intended to be used it will have rigidity. Other thermoplastic elements include ionomers because of their usual low creep rate below their melting point and high rigidity.

The thermoplastic element may also be thermosetting, although it is not critical to the present invention. If the thermoplastic element is also thermosetting, the time between the preheating step and the step of placement of the composite into the cold mold will be carefully regulated to insure that thermosetting does not occur prior to the formation of the predetermined surface configuration in the mold. The temperature at which the composite is heated will depend upon the particular thermoplastic element which is utilized. Preferably, this temperature is within the range of about 70°–180° C.

The substrate and the thermoplastic element may be first contacted and then heated together in one embodiment of the invention. Alternatively, the substrate may be separately heated, contacted with the cool thermoplastic element, then the warm composite will be placed in the mold. Combinations of these methods may also be utilized whereby the substrate and thermoplastic element are heated separately then contacted with each other prior to placement into the mold. The method which is chosen will in part depend upon the type of thermoplastic element which is utilized, as well as the first temperature which is required to obtain bond strength and durability.

According to the present invention, after the heated composite is placed into a cool mold cavity (usually at above room temperature, i.e., at about 40°–50° C.), the mold is clamped, whereby the thermoplastic element and substrate are comolded into the desired shape. The comolded composite cools during the molding process by transfer of heat to the mold, but due to the mass and heat capacity, the mold itself remains essentially isothermal throughout the molding process.

The exact amount of time and the temperature to which the substrate and the thermoplastic element are heated, separately or together, prior to insertion into the mold may be readily determined by those of ordinary skill in the art. It will be dependent upon, at least in part, the type of thermoplastic element which is used, the relative thickness of the desired molded product to be formed, mold pressure, and the like. These temperatures and times may be determined by those skilled in the art and/or from the specification provided by the manufacturing source of the particular thermoplastic element.

Conventional molding apparatus having steel platens may be utilized to conduct the process according to the present invention.

The method according to the present invention is particularly useful for the production of optical elements, and in particular Fresnel lenses.

The invention may be further understood by reference to the following examples illustrating some preferred procedures for the production of molded composite products in accordance with the present invention.

EXAMPLE

An 18 mil thick sheet of SURLYN ®, an ionomer made by DuPont, at 20° C. is placed on a 0.125 inch thick glass plate that has been preheated to 160° C. (320° F.). The sheet quickly heats up to about 140° C. (280° F.). The composite is then placed into a mold having a steel platen and electroformed—nickel form on the SURLYN ® side (initially at 50° C. (122° F.) and steel platen (initially at 40° C. (104° F.) on the glass side. The outer sides of the platens are kept at the initial temperature by steam at saturation pressure. The assembly is clamped, remaining in that position for about 15 seconds. Upon opening the mold assembly the formed lens is freely released from the mold and the lens is of optical quality, free of glass and plastic defects.

The foregoing example is illustrative of the procedures by which the composite article may be provided in accordance with the present invention. Various other processing techniques may be resorted to fabricating lenses, as well as other composite articles within the scope of the appended claims.

What is claimed is:

1. A method for producing a molded optical lens comprising an optical glass substrate bonded to a thermoplastic element, comprising the steps of:
   providing a heated composite of said substrate in contact with said thermoplastic element at a temperature sufficient to soften said thermoplastic element for a molding operation;
   juxtaposing said heated composite in a mold cavity characterized by a predetermined surface configuration, said cavity being at a temperature in the range of about 40°–50° C., whereby said composite is cooled and molded into said configuration to form said optical lens whereby said mold remains essentially isothermal;
   removing said molded optical lens from said cavity.

2. The method according to claim 1 wherein said step of providing said heated lens comprises heating said lens external to said mold cavity.

3. The method according to claim 1 wherein said step of providing said heated lens comprises the steps of separately heating said substrate and then contacting said heated substrate with said thermoplastic element.

4. The method according to claim 1 wherein said first temperature is in the range of 70°–180° C.

* * * * *